US006675904B2

(12) United States Patent

Joung

(10) Patent No.: US 6,675,904 B2

(45) Date of Patent: Jan. 13, 2004

(54) APPARATUS FOR CONTROLLING AN AMOUNT OF FLUID FOR HEAVY CONSTRUCTION EQUIPMENT

(75) Inventor: Hae Kyun Joung, Pusan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 10/247,556

(22) Filed: Sep. 19, 2002

(65) Prior Publication Data

US 2003/0115878 A1 Jun. 26, 2003

(30) Foreign Application Priority Data

Dec. 20, 2001 (KR) ...................................... P2001-81837
Dec. 21, 2001 (KR) ...................................... P2001-82744

(51) Int. Cl.[7] ............................. E02F 5/02; G05D 1/02; G05D 1/04

(52) U.S. Cl. ............................... 172/2; 37/348; 37/382; 414/699; 701/50

(58) Field of Search ............................ 172/2, 3, 4, 4.5, 172/7–12, 810, 811; 37/348, 382, 907; 701/50; 414/699

(56) References Cited

U.S. PATENT DOCUMENTS

H1822 H * 12/1999 Kelley et al. ............... 180/333

* cited by examiner

*Primary Examiner*—Christopher J. Novosad
(74) *Attorney, Agent, or Firm*—Ladas and Parry

(57) ABSTRACT

A set amount of fluid can be constantly supplied to an actuator and a flow-back of fluid from the actuator can be prevented, even in case of developing variations of a load pressure of the actuator and a pressure of a hydraulic pump, and provided is a control valve for controlling the driving of the actuator connected to the hydraulic pump, a logic check valve mounted in a path between the hydraulic pump and the control valve to be opened and shut, and a logic control valve mounted between the hydraulic pump and the pressure chamber of the logic check valve and for controlling an amount of fluid passing through the upper side of the logic check valve from the hydraulic pump upon switching.

7 Claims, 8 Drawing Sheets

APPARATUS FOR CONTROLLING AN AMOUNT OF FLUID FOR HEAVY CONSTRUCTION EQUIPMENT

BACKGROUND OF THE INVENTION

1. Field of the Invention

The present invention relates to an apparatus for controlling an amount of fluid for heavy construction equipment, which can constantly supply an amount of hydraulic fluid to an actuator and prevent fluid from being fed back from the actuator in occasions that a load pressure on the actuator mounted in heavy construction equipment such as excavators and a pressure of a hydraulic pump vary.

2. Description of Prior Art

FIG. 1 is a view for showing a hydraulic circuit of a conventional apparatus for controlling an amount of fluid for heavy construction equipment.

As shown in FIG. 1, the conventional apparatus for controlling an amount of fluid for heavy construction equipment includes a hydraulic pump P connected to an engine, an actuator 300 connected to the hydraulic pump P and driven upon supplying hydraulic fluid, a control valve 100 mounted to a parallel hydraulic path 103 between the hydraulic pump P and the actuator 300 and for controlling starts, stops, and direction switchings of the actuator 300, and fluid amount control valves 400, 400A, and 400B mounted in paths between ports 101 and 102 on outlets of the control valve 100 and the actuator 300 and for restricting an amount of fluid supplied to the actuator 300 and controlling a driving speed thereof.

A reference number 105 not described in the drawing denotes a central bypass path, and 106 a relief valve for draining hydraulic fluid into a hydraulic oil tank T when a load over a pressure set in the hydraulic circuit is developed.

Accordingly, as a pilot signal pressure Pi based on a manipulation of a joy stick not shown is applied to the right end of the control valve 100 to switch an inner spool to the left direction on the drawing of FIG. 1, hydraulic fluid discharged from the hydraulic pump P is supplied to a large chamber 302 of the actuator by way of the parallel path 103 and the position-switched control valve 100, and, at the same time, hydraulic fluid fed back from a small chamber 301 of the actuator 300 is drained to the hydraulic oil tank T via a check valve 405B, causing the actuator 300 to drive.

At this time, in case of restricting the amount of fluid in order to control a driving speed of the actuator 300 according to a work condition, the fluid amount control valve 400A can control the amount of fluid flowing in the large chamber 302 based on a pressure difference with a spring valve 404A set according to a pressure difference of inlet and outlet paths 402A and 403A of a spool 402 due to the extent of the opening of a throttle valve 401A.

However, the fluid amount control apparatus as stated above requires separate blocks to install the hydraulic amount control valve 400 in the hydraulic paths between the ports 101 and 102 at the outlets of the control valve 100 and the actuator 300, causing problems increasing the costs due to the increase of the number of parts, interfering among parts on a layout when designing, and making its use impossible in a place of narrow space.

Further, as mentioned above, the fluid amount control valve 400 does not have a check function for the case that a load pressure on the side of the actuator is higher than a discharge pressure on the side of the hydraulic pump P, causing a problem separately installing the check valve 104 in the parallel path 103 at the side of the inlet of the control valve 100.

FIG. 2 is a view for showing a hydraulic circuit for a conventional apparatus for controlling an amount of fluid.

As shown in FIG. 2, the fluid amount control apparatus has a hydraulic pump P, actuators A, B, and C connected to the hydraulic pump and driven upon hydraulic fluid supplies, and direction switching valves D, E, and F installed in hydraulic paths between the hydraulic pump P and the actuators A, B, and C and for controlling the flow directions of the hydraulic fluids supplied to the actuators A, B, and C.

At this time, the direction switching valve E includes a pump path 500 connected to the actuator B, load paths 503 and 504 having load ports 501 and 502 communicated with the actuator B, a transfer path 505 branched from the pump path 500 and connected to the load paths 503 and 504, a control valve 511 mounted in a central bypass path 510 and for controlling hydraulic fluid supplied to the actuator B, a seat valve 512 mounted to be opened and shut between the pump path 500 and the control valve 511, and a pilot spool valve 513 mounted between the seat valve 512 and the control valve 511, enabling to restrict an amount of hydraulic fluid supplied to variable throttle valves 515 and 516 of the control valve 511 through the pump path 500 and the transfer path 505 from the hydraulic pump P and to control an amount of hydraulic fluid flowing in the load paths 503 and 504 of the actuator B.

At this time, the transfer path 505 has a path 506 communicated with the pump path 500, a pair of paths 507 and 508 positioned on both sides of the path 506, and an annular path 509 connecting the pair of paths 507 and 508 and the path 506.

Accordingly, as a pilot signal pressure due to an manipulation of a driver is applied to a control valve 514 of the direction switching valve D, hydraulic fluid discharged from the hydraulic pump P is supplied to the actuator A via the position-switched control valve 514 to drive the actuator A, thereby proportionally controlling the amount of the hydraulic fluid supplied to the actuator B via the control valve 511 switched owing to the application of the pilot signal pressure.

However, since the pilot spool valve 513 maintains an initial open state all the time, in case that load pressures occurring on the load paths 503 and 504 of the actuator B are higher than a pressure of the hydraulic fluid discharged from the hydraulic pump P, a feedback flow occurs through the seat valve 512 and then a set working pressure is not supplied to the actuator B to make impossible its controls, causing a problem bringing out a safety incident.

In taking it into account, a feedback prevention check valve is installed in a seat valve not shown, but it has a loose response to the feedback, causing a problem deteriorating the reliability of equipment and raising the manufacture cost due to the increase the number of parts.

Further, an amount of hydraulic fluid supplied to the actuator B according to a load pressure of the actuator B and a discharge pressure from the hydraulic pump P varies, leading to a problem developing a safety incident.

SUMMARY OF THE INVENTION

It is an object of the present invention to provide an apparatus for controlling an amount of fluid for heavy construction equipment, which can prevent layout interferences when designing and be used in a narrow space due to a compact structure that a fluid amount control valve controlling a driving speed of an actuator is installed inside a control valve controlling a flow direction of hydraulic fluid supplied to the actuator.

It is another object of the present invention to provide an apparatus for controlling an amount of fluid for heavy construction equipment, which can enhance the durability of parts by reducing hunting and shock phenomena due to variations of a load pressure of an actuator and a pressure of a hydraulic pump.

It is yet another object of the present invention to provide an apparatus for controlling an amount of fluid for heavy construction equipment, which can enhance a response property by carrying out a function of a check valve when a load pressure of a work device is higher than a discharge pressure of a hydraulic pump.

In order to achieve the above objects, an apparatus for controlling an amount of fluid for heavy construction equipment according to a preferred embodiment of the present invention, in an apparatus for controlling an amount of fluid for heavy construction equipment having a hydraulic pump, an actuator connected to the hydraulic pump and driven upon hydraulic fluid supplies, and a control valve installed in a parallel fluid path between the hydraulic pump and the actuator and for controlling starts, stops, and direction switchings of the actuator, comprises a logic check valve mounted to be opened and shut between an inlet-side path of the control valve and the parallel path, and a logic control valve for opening and shutting an inlet-side path communicated with the parallel path and an outlet-side path connected to a pressure chamber of the logic check valve upon switching based on a set elastic force of a valve spring and a pressure in a path on a side of the actuator connected to one side of the pressure chamber with respect to a pressure in an inlet-side path connected to the other side of the pressure chamber.

According to a preferred embodiment, an orifice is installed in the outlet-side path connecting the logic check valve and the logic control valve.

Further, a piston is installed in the pressure chamber of the logic check valve and an orifice is installed in a path passing through the piston.

Further, a check valve is installed in a path connecting the logic check valve and the inlet-side path, and an orifice is installed in a branched path before and after the check valve.

Further, an orifice is installed in the path connecting the inlet-side path of the logic control valve and the pressure chamber of the logic check valve.

Further, a variable orifice is installed in an inlet-side path of a spool of the logic control valve.

Further, the logic check valve further includes a controllable throttle for varying an opening area with respect to an inlet path from the parallel path based on displacements of a valve seat of the logic check valve.

BRIEF DESCRIPTION OF THE DRAWINGS

The above objects and other features of the present invention will become apparent by describing in detail a preferred embodiment thereof with reference to the attached drawings, in which.

DETAILED DESCRIPTION OF THE PREFERRED EMBODIMENTS

Hereinafter, an apparatus for controlling an amount of fluid for heavy construction equipment according to an embodiment of the present invention is described in more detail with reference to the accompanying drawings.

Figure 3:
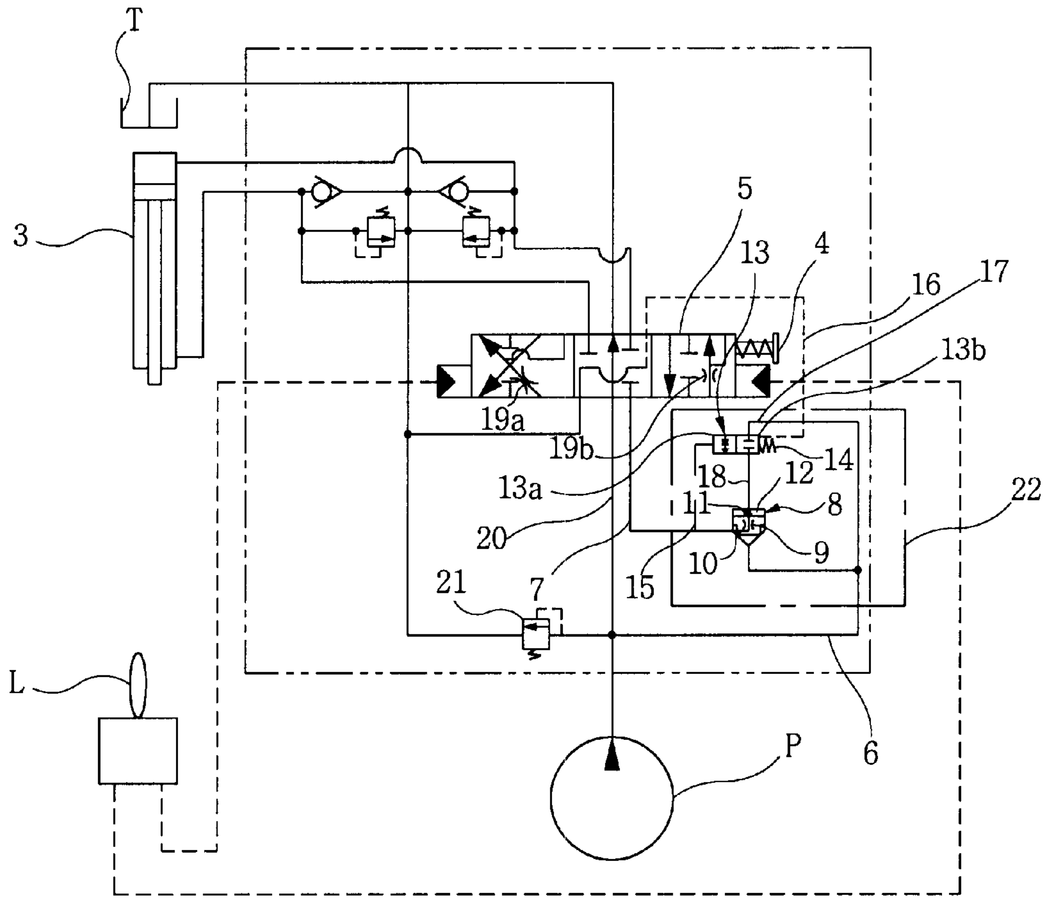
FIG. 3 is a view for showing a hydraulic circuit of an apparatus for controlling an amount of fluid for heavy construction equipment according to a preferred embodiment of the present invention.
Figure 4:
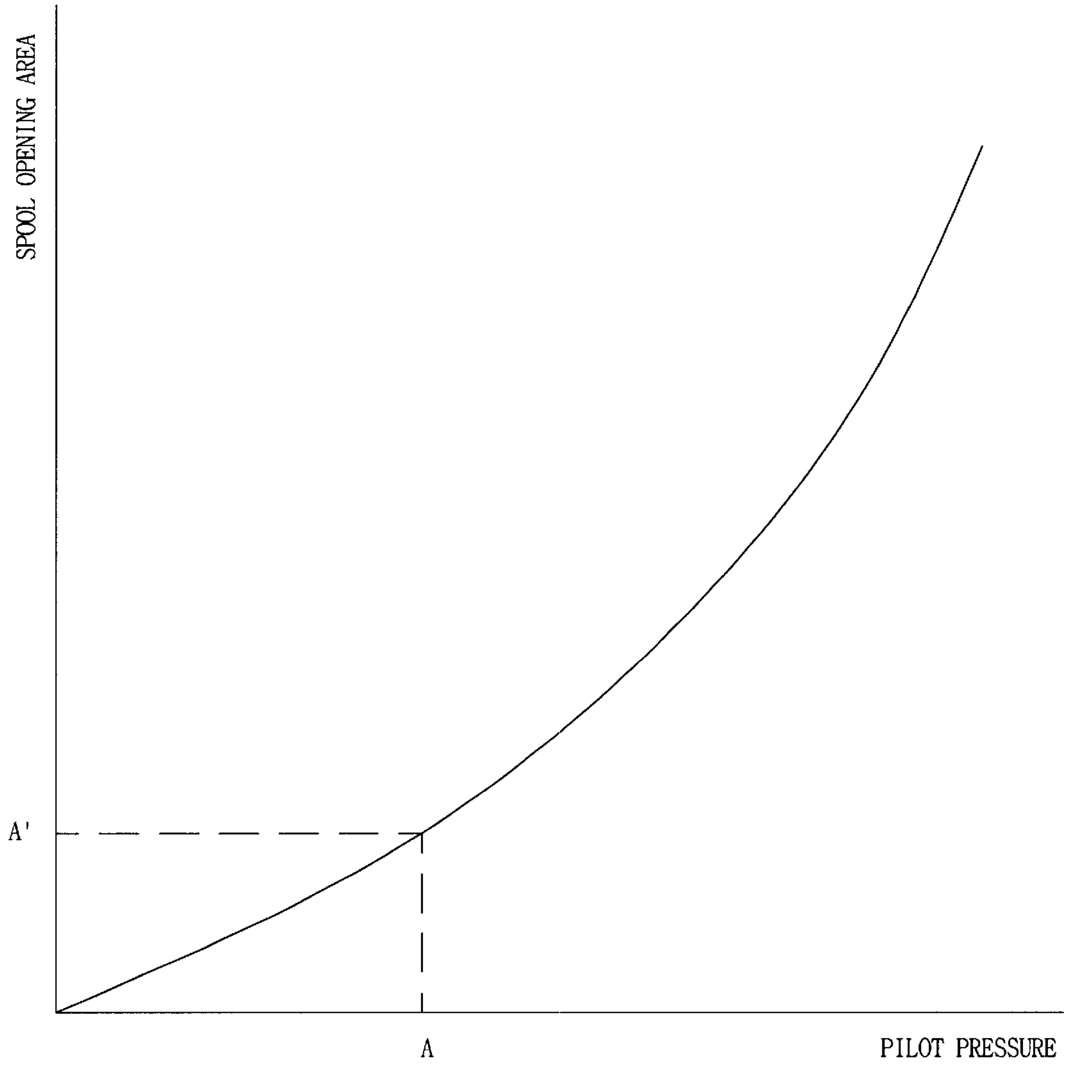
FIG. 4 is a graph showing a relationship between a pilot pressure and a spool opening area.

FIG. 3 is a view for showing a hydraulic circuit of an apparatus for controlling an amount of fluid for heavy construction equipment according to a preferred embodiment of the present invention, and FIG. 4 is a graph showing a relationship between a pilot pressure and a spool opening area.

As shown in FIGS. 3 and 4, the apparatus includes a hydraulic pump P, an actuator 3 connected to the hydraulic pump P and driven upon hydraulic fluid supplies, a control valve 4 installed in a parallel fluid path 6 between the hydraulic pump P and the actuator 3 and switched upon an application of a pilot signal pressure based on a manipulation of an operation lever L to control starts, stops, and direction switchings of the actuator 3, and a fluid amount control valve 22 of a feedback prevention and pressure compensation type, which is mounted to be opened and shut between a path 7 on the inlet side of the control valve 4 and the parallel path 6.

The fluid amount control valve 22 is constructed with an orifice 9 installed in a check path 10 connecting the outlet-side path 7 and a pressure chamber 12 and a logic check valve 8 biasing in an initial state the shut-off of the parallel path 6 and the outlet-side path 7 by a pre-set elastic force of a valve spring 11, and a logic control valve 13 a pressure chamber **13*a* of which is connected with a path 15 detecting a pressure inside the outlet-side path 7 passing the logic check valve 8 and a pressure chamber 13*b* of which is connected with a path 16 detecting a load pressure of the actuator 3 passing the control valve 4 and orifices 19*a* and 19*b* wherein the logic control valve 13 opens and shuts an inlet-side path 17 communicated with the parallel path 6 and an outlet-side path 18 connected with the pressure chamber 12 of the logic check valve 8 upon switching based on a pressure difference between the paths 5 and 16 and the pre-set elastic force of a valve spring 14**.

At this time, the path 16 is communicated with the hydraulic oil tank T in case that the control valve 4 is in the neutral position, and senses load pressures at downstream sides of the orifices 19, **19*a*, and 19*b* in case that a spool 5 of the control valve 4** is switched to the left or right direction based on an application of the pilot signal pressure Pi.

A reference number 20 not described in the drawings denotes a central bypass path, and 21 a relief valve forming a working pressure set in the hydraulic circuit.

Hereinafter, the operations of an apparatus for controlling an amount of fluid for heavy construction equipment according to a preferred embodiment of the present invention are described in detail with reference to the accompanying drawings.

FIG. 4 is a graph for showing a relationship between pilot pressures and spool opening areas.

As shown in FIG. 4, in case of switching the control valve 4 to the left or right direction with a set pressure based on an application of a pilot signal pressure when manipulating the pilot operation lever L by a driver, that is, in case of switching with a pilot pressure "A" on the line of the opening area of the spool 5, the opening area of the control valve 4 is set to "A".

At this time, the central bypass path 20 is shut off, and the hydraulic fluid discharged from the hydraulic pump P passes in turn through the opening areas of the parallel path 6—logic check valve 8—inlet-side path 7—spool 5 and then goes into a large chamber of the actuator 3, enabling a prolonged driving.

At this time, in case of tending to control a driving speed of the actuator 3 by restricting the hydraulic fluid supplied to the actuator 3 based on a work condition, if an area through which hydraulic fluid passes when the pilot pressure of the control valve 4 has been switched to "A" is set to "A", an amount of fluid Q passing through them becomes as follows:

$$Q=Cd\times A'\times\sqrt{\Delta P}$$

Here, Cd: flow coefficient, A': orifice area, and ΔP: pressure difference before and after the orifice.

That is, the hydraulic fluid passing through the spool 5 becomes proportional to a cross-sectioned area of the orifice when the pressure difference before and after the orifice 19 is equally maintained.

At this time, when the opening area of the spool 5 is set to "A" and a pressure difference (a pressure at the inlet of the control valve 4—a load pressure of the actuator 3) before and after the orifice 19 is below a set value, the hydraulic fluid passing through the orifice 19 flows in without controls since the logic control valve 13 is not controlled but maintained in the initial neutral state.

In the meantime, in case the hydraulic fluid gradually increases so that the pressure difference before and after the orifice 19 goes beyond the set value, a working pressure occurring at the inlet-side path 7 becomes larger than the elastic force of the valve spring 14 of the logic control valve 13 to switch the logic control valve 13 to the right direction on the drawing, so that the inlet-side path 17 is communicated with the outlet-side path 18 in order for the controlled hydraulic fluid discharged from the hydraulic pump P to reach the pressure chamber 12 of the logic check valve 8.

The controlled hydraulic fluid reached to the pressure chamber 12 flows out to the inlet-side path via the orifice 9 of the logic check valve 8. An amount of fluid flowing in the pressure chamber 12 of the logic check valve 8 by means of the orifice 9 of the logic check valve 8 increases and decreases based on the displacement of the logic control valve 13, and the pressure of the pressure chamber 12 of the logic check valve 8 is controlled based on the increase and decrease of the amount of fluid.

Further, since the logic check valve 8 moves to the seat direction due to the pressure of the pressure chamber 12 of the logic check valve 8 based on a difference of the cross-sectioned areas of the pressure chamber 12 of the logic check valve 8 and the seat, the an area of the logic check valve 8 through which hydraulic fluid passes becomes smaller, thereby decreasing the amount of fluid.

Accordingly, an amount of fluid passing through the area A' of the orifice of the spool 5 is constantly maintained since hydraulic fluid flows with a constant pressure difference all the time regardless of the variations of the load pressure of the actuator 3 and the pressure of the hydraulic pump P, so that the layout interferences due to a compact structure when designing can be prevented.

Further, in case that the load pressure of the actuator 3 varies or the pressure of the hydraulic pump P instantly varies, the pressure of the pressure chamber 12 of the logic check valve 8 based on the displacement of the fluid amount control valve 22 is twice controlled to reduce the hunting and shock, thereby enabling the stability of a hydraulic system to be secured.

In the meantime, since the logic control valve 13 is shut off due to its neutral position (refer to FIG. 3) in case that a load pressure of the actuator 3 is higher than a discharge pressure of the hydraulic pump P, the logic check valve 8 has a function of a general check valve with an excellent response thereof, so that the reliability of equipment can be enhanced.

As stated above, in the fluid amount control apparatus according to a preferred embodiment of the present invention, hydraulic fluid from the hydraulic pump P is controlled based on a switching amount of the logic control valve 13 when passing through the pressure chamber 12 of the logic check valve 8, and the pressure of the pressure chamber 12 of the logic check valve 8 is controlled by the hydraulic fluid passing through the pressure chamber 12, so that the a constant amount of fluid can be supplied to the actuator 3 regardless of the variations of the load pressure of the actuator 3 and the pressure of the hydraulic pump P and prevent the hydraulic fluid from flowing back from the actuator 3.

FIGS. 5 to 8 are views for showing a main part of a fluid amount control apparatus according to another preferred embodiment of the present invention.

Figure 1:
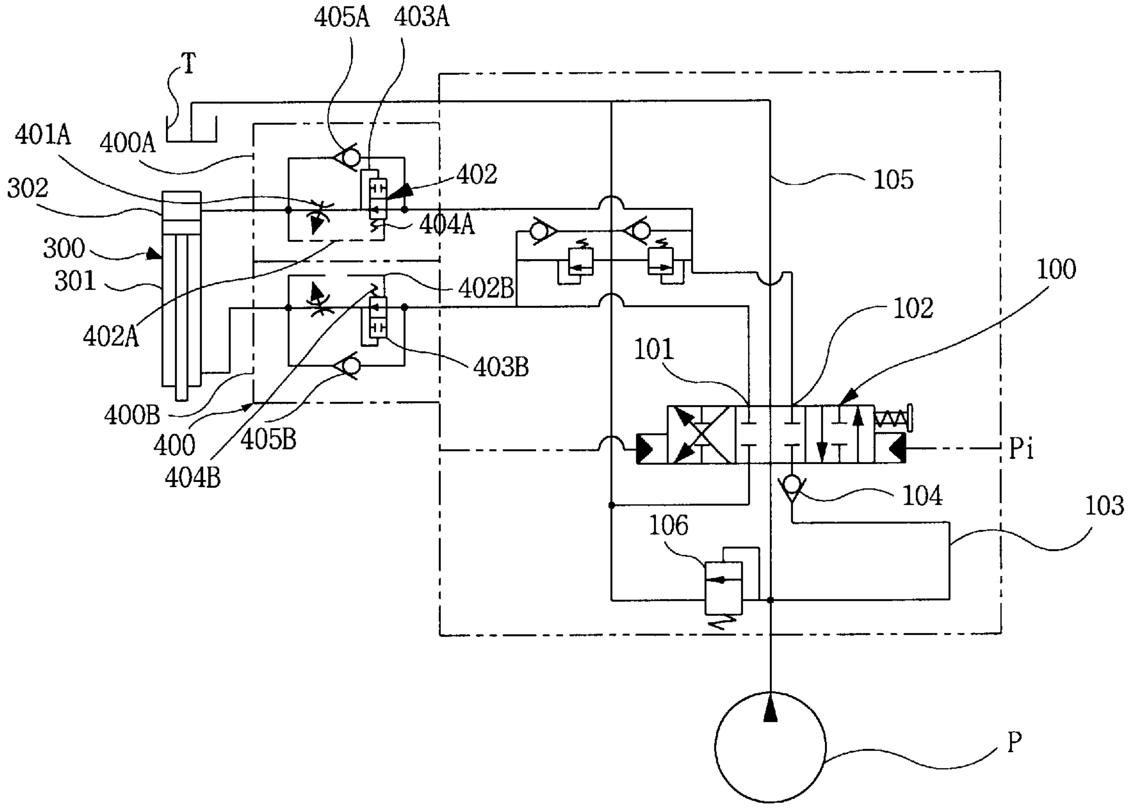
FIG. 1 is a view for showing a conventional hydraulic circuit of an apparatus for controlling an amount of fluid for heavy construction equipment.
Figure 2:
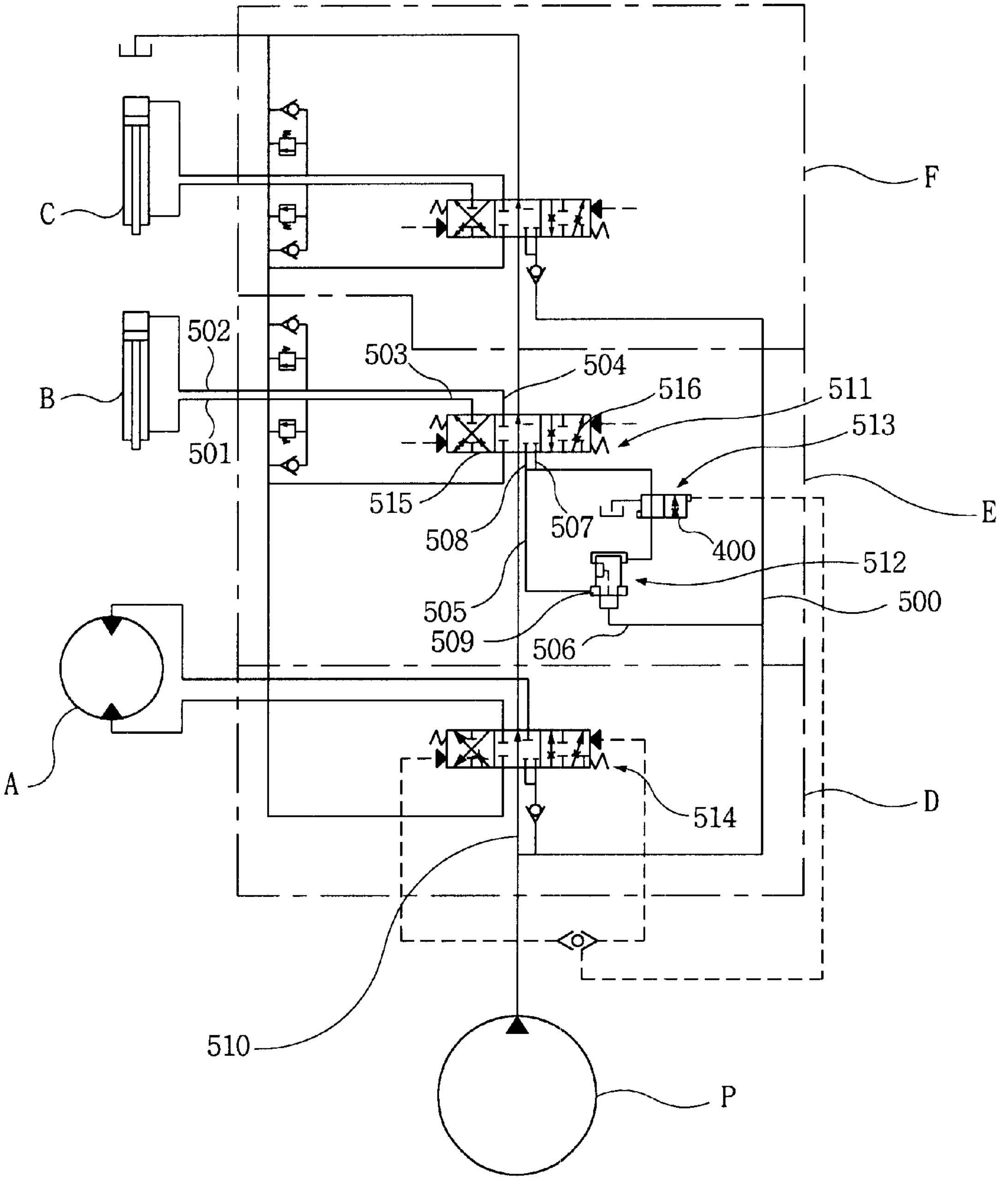
FIG. 2 is a view for showing another conventional hydraulic circuit of an apparatus for controlling an amount of fluid.

As shown in FIGS. 5 to 8, the actuator 3 driven with the connection to the hydraulic pump P, the logic check valve 8 mounted in the path between the hydraulic pump P and the actuator 3, the logic check valve 13 mounted in the path between the pressure chamber 12 of the logic check valve 8 and the hydraulic pump P, and so on, are substantially the same as those of the fluid amount control apparatus according to the embodiment of the present invention shown in FIG. 2, so the description on those will be omitted.

Figure 5:
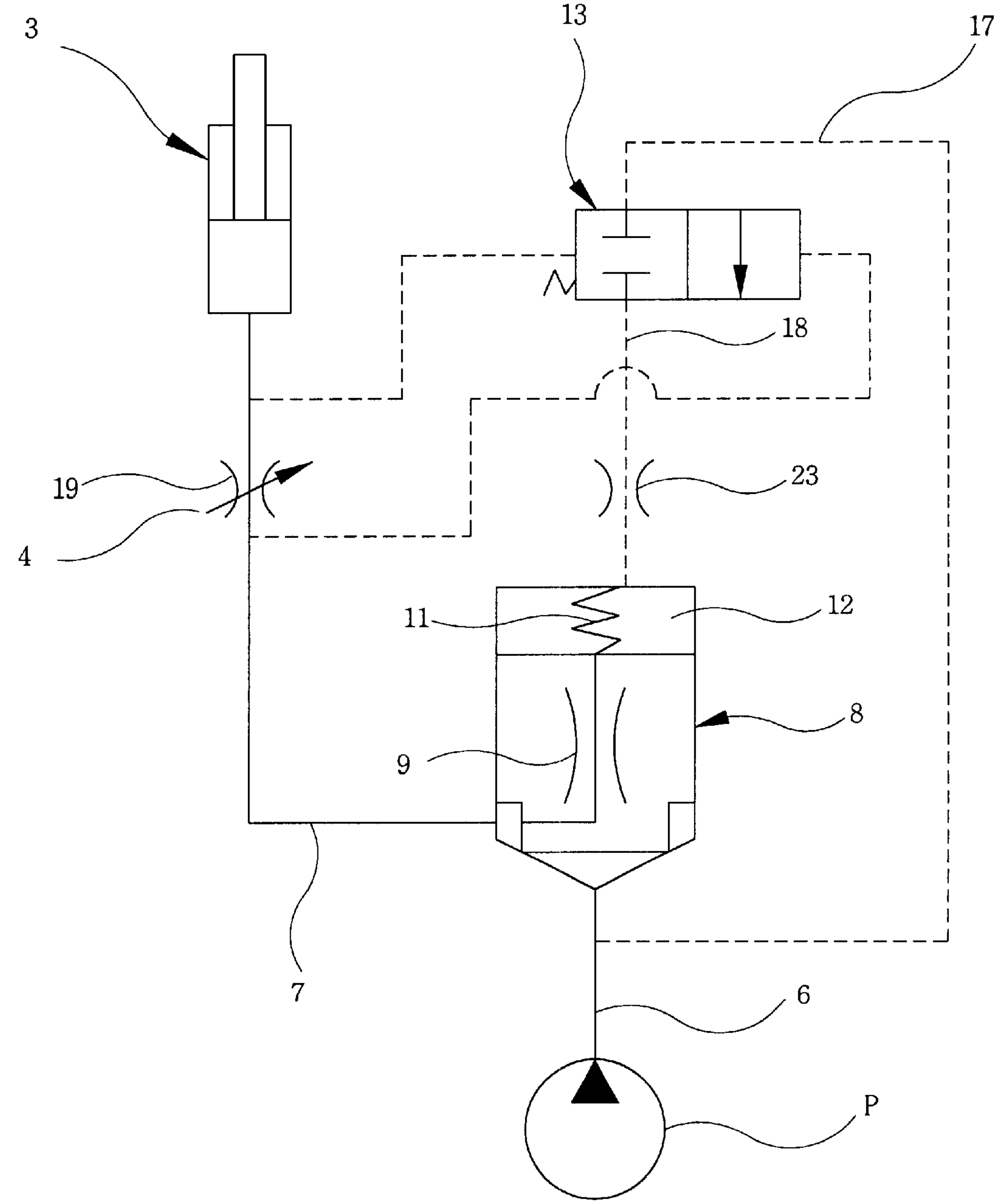
FIG. 5 is a view for showing a main part of an apparatus for controlling an amount of fluid according to a preferred embodiment of the present invention.

As shown in FIG. 5, since the fluid amount control apparatus according to anther preferred embodiment of the present invention secures a damping effect with an orifice 23 installed in a path 18 connecting the pressure chamber 12 of the logic check valve 8 and the logic control valve 13, the apparatus can prevent the variations of the pressure of the hydraulic pump P or the abrupt fluid amount and pressure due to a load pressure of the actuator 3, to thereby enabling the hunting and the instability of a hydraulic system to be prevented.

Figure 6:
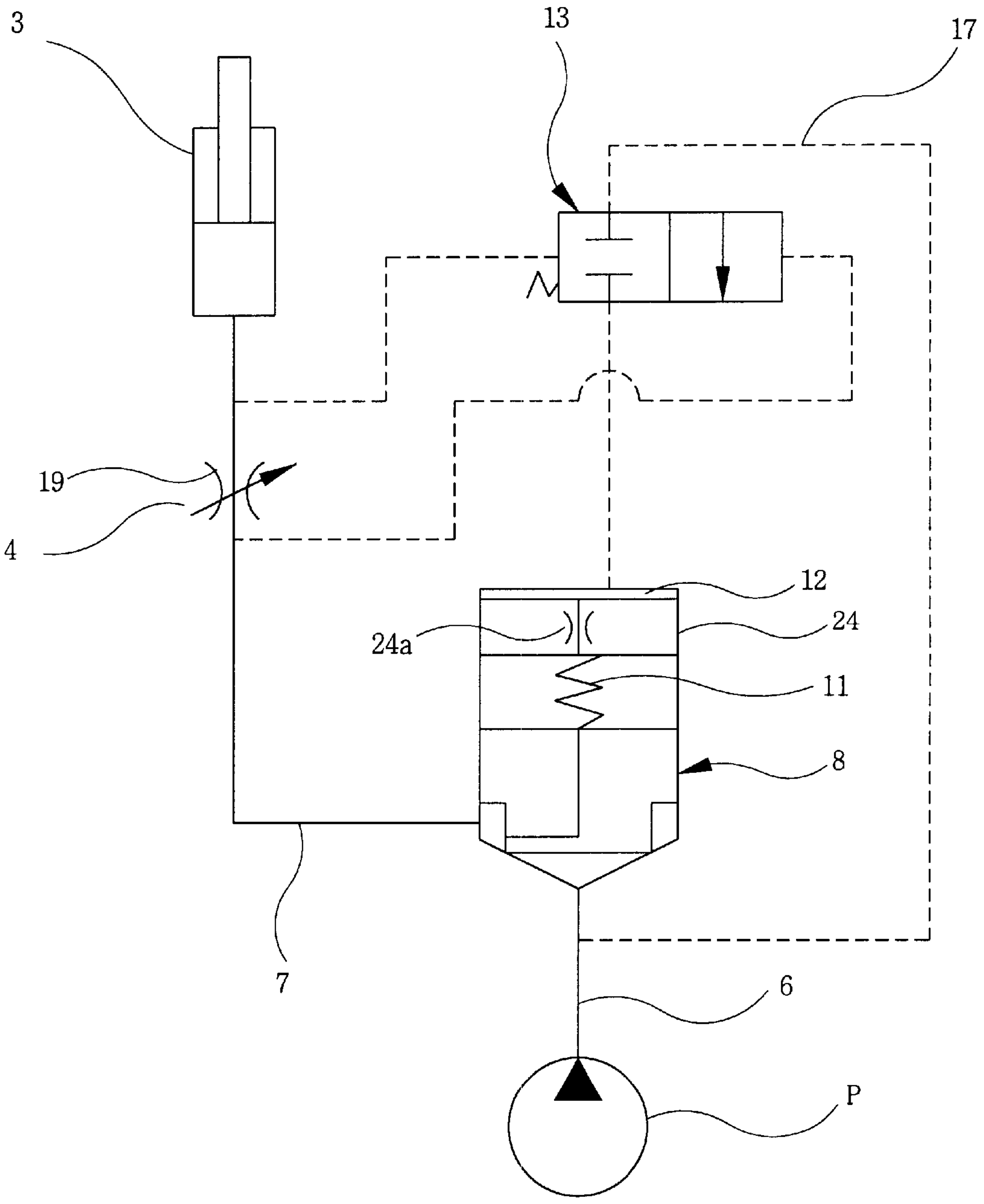
FIG. 6 is a view for showing a main part of an apparatus for controlling an amount of fluid according to another preferred embodiment of the present invention.

As shown in FIG. 6, since an apparatus for controlling an amount of fluid according to a preferred embodiment of the present invention has a piston 24 in the pressure chamber of the logic check valve 8 and an orifice **24*a* installed in a path passing through the piston 24, the pressure chamber 12 of the logic check valve 8 is promptly supplied with hydraulic fluid in case that a load pressure of the actuator 3** is higher than a discharge pressure of the hydraulic pump P, so the apparatus has an excellent response when carrying out a flow-back prevention function.

Figure 7:
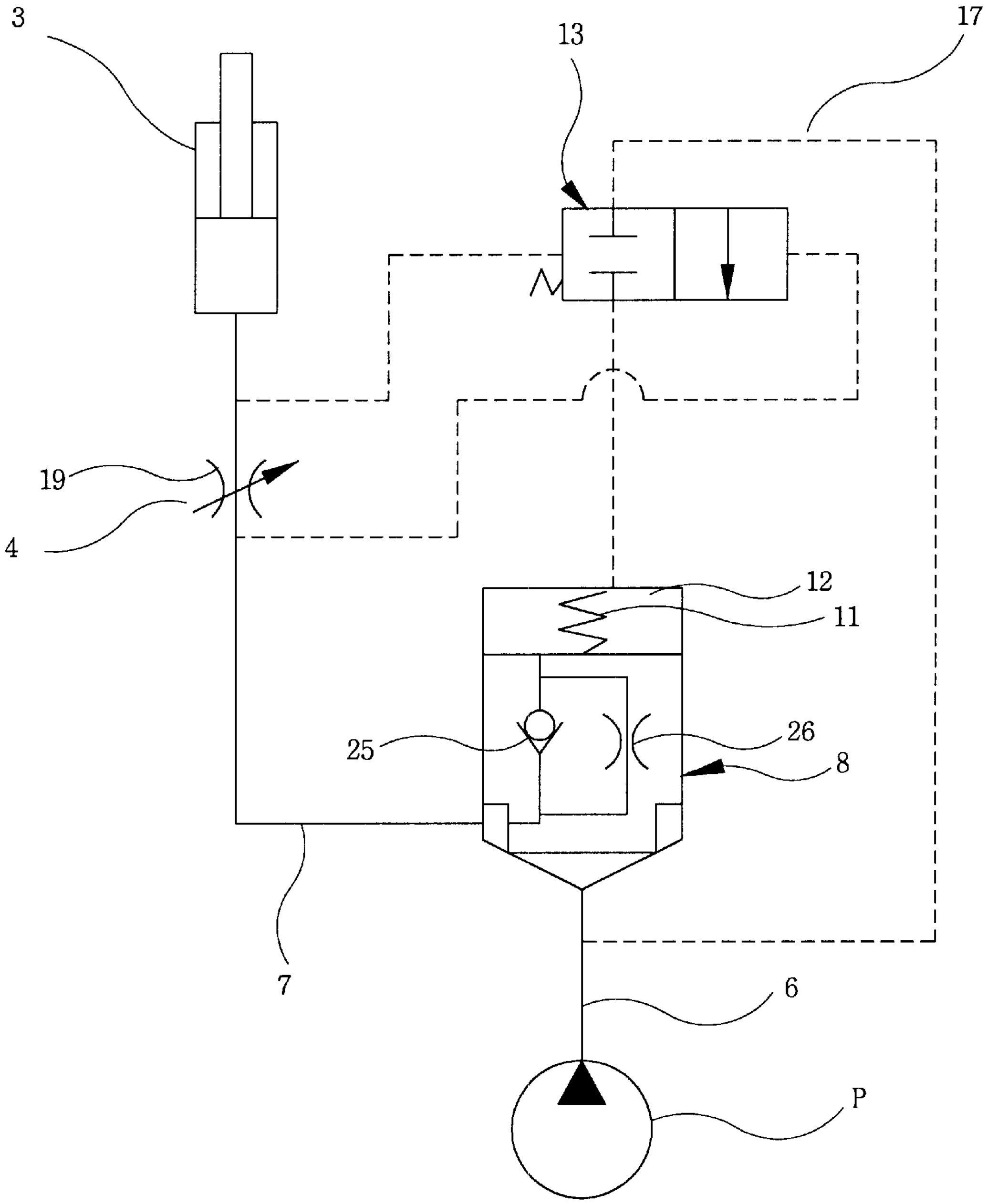
FIG. 7 is a view for showing a main part of an apparatus for controlling an amount of fluid according to yet another preferred embodiment of the present invention.

As shown in FIG. 7, an apparatus for controlling an amount of fluid according to a preferred embodiment of the present invention has a check valve 25 installed in the path connecting the pressure chamber 12 of the logic check valve 8 and the inlet-side path 7 and an orifice 26 installed a branched path before and after the check valve 25, so that hydraulic fluid can be supplied to the pressure chamber 12 of the logic check valve 8 through the check valve 25 when carrying out a flow-back prevention function, and controlled hydraulic fluid can pass through only the orifice when adjusting an amount of fluid.

Figure 8:
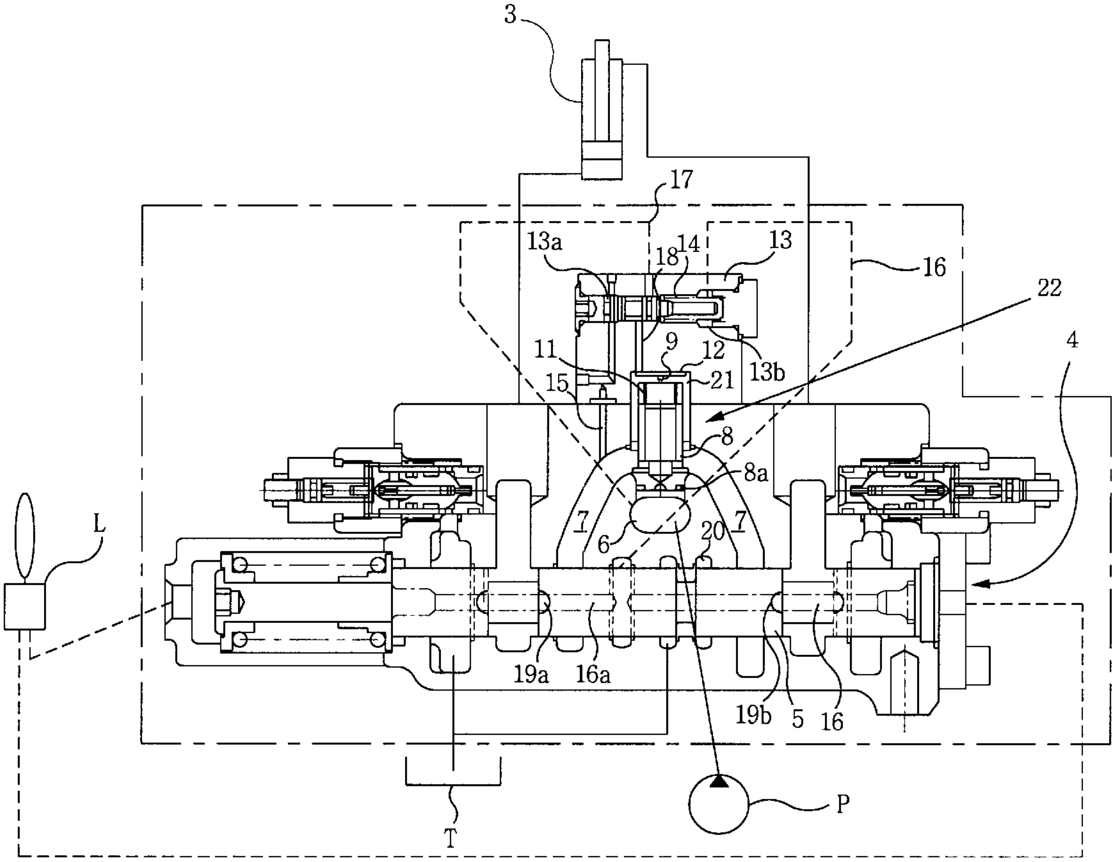
FIG. 8 is a view for showing a main part of an apparatus for controlling an amount of fluid according to a further preferred embodiment of the present invention.

As shown in FIG. 8, an apparatus for controlling an amount of fluid for heavy construction equipment according to another preferred embodiment of the present invention includes the actuator 3 driven with the connection to the hydraulic pump P, the control valve 4 mounted in the path between the hydraulic pump P and the actuator 3, the logic check valve 8 mounted in the path between the hydraulic pump P and the control valve 4, the logic control valve 13 mounted in the path between the pressure chamber 12 of the logic check valve 8 and the hydraulic pump P, and so on, which are the same as those of the apparatus for controlling an amount of fluid according to an embodiment of the present invention shown in FIG. 3, so that the descriptions on those will be omitted and like reference numbers denote like parts.

In the apparatus for controlling an amount of fluid for heavy construction equipment according to anther preferred embodiment of the present invention, the valve seat of the logic check valve 8 has a controllable throttle 8*a* formed around the outer periphery thereof, and the throttle 8*a* varies an opening area with respect to the inlet path 7 from the parallel path 6 of the hydraulic pump P based on the displacement of the seat, so the control the amount of fluid supplied to the actuator 3 becomes facilitated.

Although the preferred embodiments of the present invention has been described, it will be understood by those skilled in the art that the present invention should not be limited to the described preferred embodiments, but various changes and modifications can be made within the spirit and scope of the present invention as defined by the appended claims.

What is claimed is:

1. An apparatus for controlling an amount of fluid for heavy construction equipment having a hydraulic pump, an actuator connected to the hydraulic pump and driven upon hydraulic fluid supplies, and a control valve installed in a parallel fluid path between the hydraulic pump and the actuator and for controlling starts, stops, and direction switchings of the actuator, comprising:

a logic control valve for opening and shutting an inlet-side path communicated with the parallel path and an outlet-side path connected to a pressure chamber of the logic check valve upon switching based on a set elastic force of a valve spring and a pressure in a path on a side of the actuator connected to one side of the pressure chamber with respect to a pressure in an inlet-side path connected to the other side of the pressure chamber.

2. The apparatus as claimed in claim 1, wherein an orifice is installed in the outlet-side path connecting the logic check valve and the logic control valve.

3. The apparatus as claimed in claim 1, wherein a piston is installed in the pressure chamber of the logic check valve and an orifice is installed in a path passing through the piston.

4. The apparatus as claimed in claim 1, wherein a check valve is installed in a path connecting the logic check valve and the inlet-side path, and an orifice is installed in a branched path before and after the check valve.

5. The apparatus as claimed in claim 1, wherein an orifice is installed in the path connecting the inlet-side path of the logic control valve and the pressure chamber of the logic check valve.

6. The apparatus as claimed in claim 1, wherein a variable orifice is installed in an inlet-side path of a spool of the logic control valve.

7. The apparatus as claimed in claim 1, wherein the logic check valve further includes a controllable throttle for varying an opening area with respect to an inlet path from the parallel path based on displacements of a valve seat of the logic check valve.

* * * * *